United States Patent
Abramov et al.

(10) Patent No.: US 8,592,716 B2
(45) Date of Patent: Nov. 26, 2013

(54) METHODS AND APPARATUS FOR INITIATING SCORING

(75) Inventors: Anatoli Anatolyevich Abramov, Painted Post, NY (US); George Davis Treichler, Hammondsport, NY (US); Naiyue Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 1161 days.

(21) Appl. No.: 12/507,248

(22) Filed: Jul. 22, 2009

(65) Prior Publication Data

US 2011/0017713 A1  Jan. 27, 2011

(51) Int. Cl.
*C03B 33/023* (2006.01)
*B23K 26/08* (2006.01)
*C03B 33/02* (2006.01)

(52) U.S. Cl.
CPC ......... *B23K 26/0884* (2013.01); *C03B 33/0215* (2013.01); *C03B 33/0235* (2013.01)
USPC ..................... 219/121.72; 219/121.85; 65/112

(58) Field of Classification Search
USPC ............. 219/121 LM, 121 L, 121.67, 121.68, 219/121.69, 121.72; 65/176, 111, 112, 113; 225/1, 2, 93.5, 94, 96, 97; 83/6, 11, 12, 83/76, 298, 304, 326, 353, 575, 614
See application file for complete search history.

(56) References Cited

U.S. PATENT DOCUMENTS

| | | | |
|---|---|---|---|
| 2,538,972 A | 1/1951 | Magnani | 164/76 |
| 3,141,589 A | 7/1964 | Jochim | 225/2 |
| 3,165,017 A | 1/1965 | Galabert | 83/7 |
| 3,282,140 A * | 11/1966 | Kawada et al. | 83/880 |
| 3,932,726 A * | 1/1976 | Verheyen et al. | 219/121.67 |
| 5,776,220 A * | 7/1998 | Allaire et al. | 65/112 |
| 6,327,875 B1 | 12/2001 | Allaire et al. | 65/103 |
| 6,407,360 B1 * | 6/2002 | Choo et al. | 219/121.67 |
| 2004/0060416 A1 * | 4/2004 | Luiz | 83/862 |
| 2006/0163306 A1 | 7/2006 | John et al. | 225/4 |
| 2008/0264994 A1 | 10/2008 | Herve et al. | 225/2 |

* cited by examiner

*Primary Examiner* — Henry Yuen
*Assistant Examiner* — Thien S Tran
(74) *Attorney, Agent, or Firm* — Jeffrey A. Schmidt; Maurice Klee (57) ABSTRACT

Methods and apparatus are provided for forming an initiation flaw (111) in the surface (114) of a glass sheet or glass ribbon (13). The initiation flaw (111) is used in connection with a laser light beam (121) and a cooling area produced by a cooling nozzle (119) to from a score line (115) in the surface (114) of the sheet or ribbon (13). The initiation flaw (111) is formed by a mechanical scoring head (20) which is carried by moving carriage (14) and which undergoes retrograde motion (19) relative to the carriage (14) so as to increase the time available for forming the initiation flaw (111).

13 Claims, 7 Drawing Sheets

METHODS AND APPARATUS FOR INITIATING SCORING

FIELD

This disclosure relates to methods and apparatus for scoring glass ribbons and glass sheets and, in particular, to methods and apparatus for mechanically forming an initiation flaw (also known as an "initial flaw," an "initiation crack," or an "initiation line") in a glass ribbon or sheet.

The following discussion refers to a glass ribbon which moves in a vertical direction, which is a typical application for the methods and apparatus disclosed herein. However, this orientation has been assumed only to facilitate the presentation and should not be interpreted as limiting the disclosure in any manner. Similarly, the disclosure is not limited to the scoring of glass ribbons, but includes scoring of individual glass sheets.

BACKGROUND

Scoring of glass is conventionally accomplished using mechanical tools. However, an alternative exists that uses laser radiation, e.g., $CO_2$ laser radiation at a wavelength of 10.6 μm, to heat the glass and create tensile stress via a temperature gradient. The use of a laser for glass scoring is discussed in commonly-assigned U.S. Pat. No. 5,776,220 entitled "Method and apparatus for breaking brittle materials" and U.S. Pat. No. 6,327,875 entitled "Control of median crack depth in laser scoring," the contents of both of which are incorporated herein by reference in their entireties.

Figure 1:
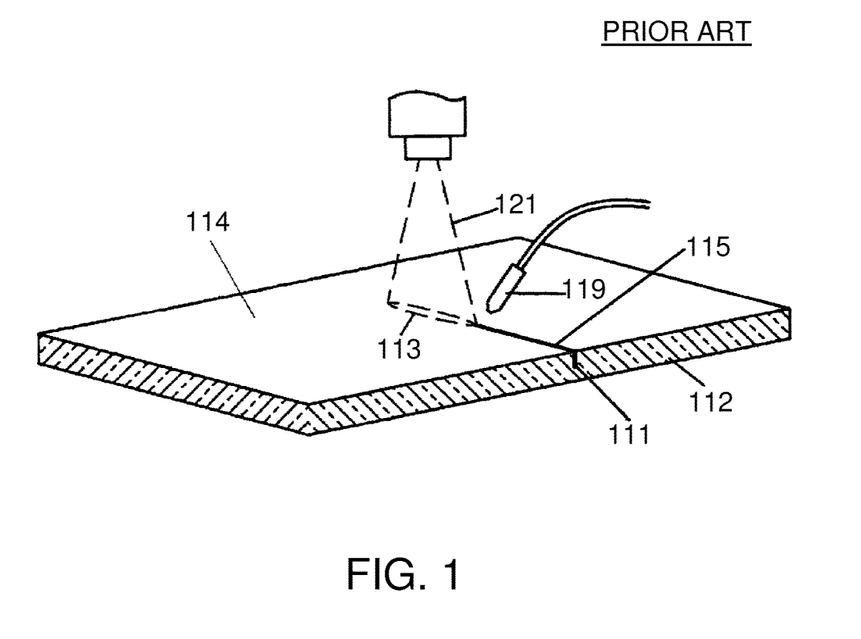
FIG. 1 is a schematic diagram illustrating laser scoring of a glass sheet.

As shown in FIG. 1, during laser scoring, a median crack (also known as a partial vent or, simply, a vent) is created in a major surface 114 of a glass sheet or ribbon 112 along a score line 115. In order to create the vent, a small initiation flaw 111 is formed on the glass surface near one of its edges, which is then transformed into the vent by propagating a laser light beam 121 having a footprint 113 across the surface of the glass followed by a cooling area produced by a cooling nozzle 119. Heating of the glass with a laser light beam and quenching it immediately thereafter with a coolant creates a thermal gradient and a corresponding stress field, which is responsible for the propagation of the initiation flaw to form the vent.

Commonly-assigned U.S. Patent Publication No. 2008/0264994 (the '994 publication), the contents of which are incorporated herein in their entirety, describes a system for laser scoring of a moving glass ribbon in which a traveling carriage moves along a linear track which is inclined at an angle α with respect to a line transverse to the direction of motion of the ribbon.

Figure 2:
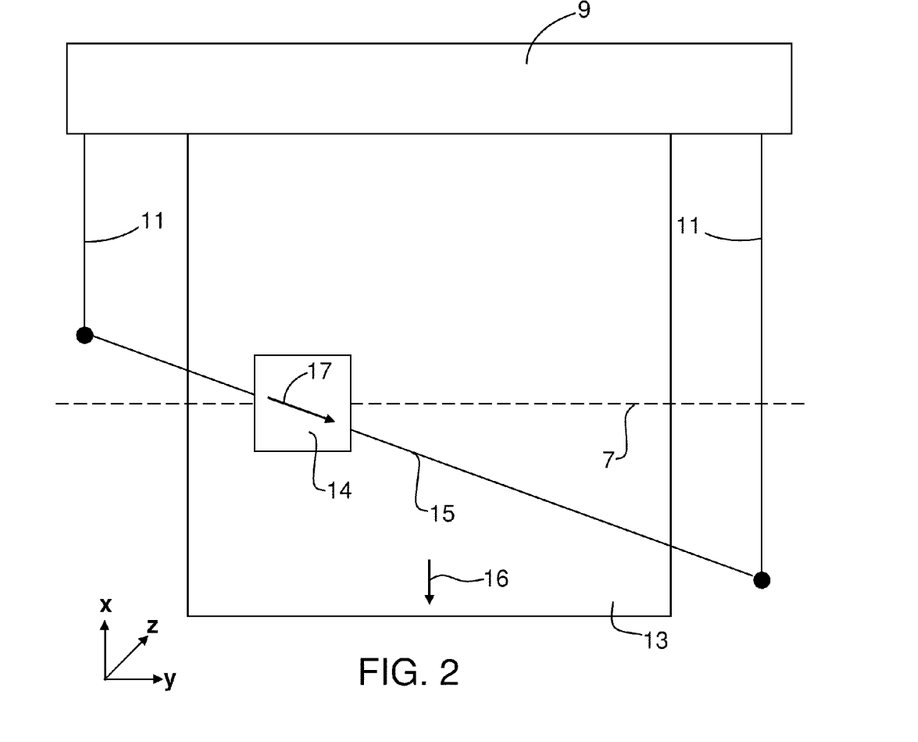
FIG. 2 is a schematic diagram illustrating a laser scoring system according to the '994 publication.
Figure 3:
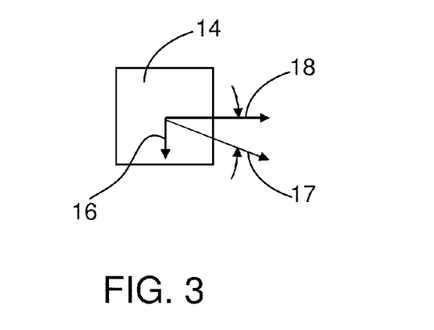
FIG. 3 is a schematic diagram illustrating the motions of the carriage of FIG. 2 in more detail.

FIGS. 2 and 3 of the present application schematically illustrate the system of the '994 publication. In this figure, the glass ribbon is identified by the reference number 13, the traveling carriage by the number 14, the linear track by the number 15, the support structure (support frame) for the track by the number 11, and the equipment which produces the ribbon, e.g., a fusion draw machine, by the number 9. As discussed in the '994 application, as seen from a fixed reference frame (e.g., the xyz reference frame in FIG. 2), the glass ribbon moves in the direction of vector 16 at a speed $S_{glass}$ and the carriage moves in the direction of vector 17 at a speed $S_{carriage}$, where $S_{glass}$, $S_{carriage}$, and the angle α satisfy the relationship:

$$S_{carriage} = S_{glass}/\sin \alpha.$$

In this way, the carriage keeps pace with the ribbon, or, more precisely, the magnitude of the component of the carriage's velocity that is parallel to the direction of motion of the ribbon equals $S_{glass}$. Consequently, as seen from the ribbon, the carriage simply moves in the direction of vector 18, i.e., across the ribbon along a line 7 perpendicular to the ribbon's direction of motion, at a speed $S_{score}$ given by:

$$S_{score} = S_{carriage} \cos \alpha.$$

As described in the '994 publication, a light-emitting device that provides a laser light beam and a nozzle that provides a stream of a cooling fluid (e.g., water) are coupled to the carriage and together form a vent across the width of the ribbon as the carriage moves along the linear track. Also coupled to the carriage is a mechanical scoring head (e.g., a scoring wheel) for forming an initiation flaw in the glass ribbon.

Figure 4:
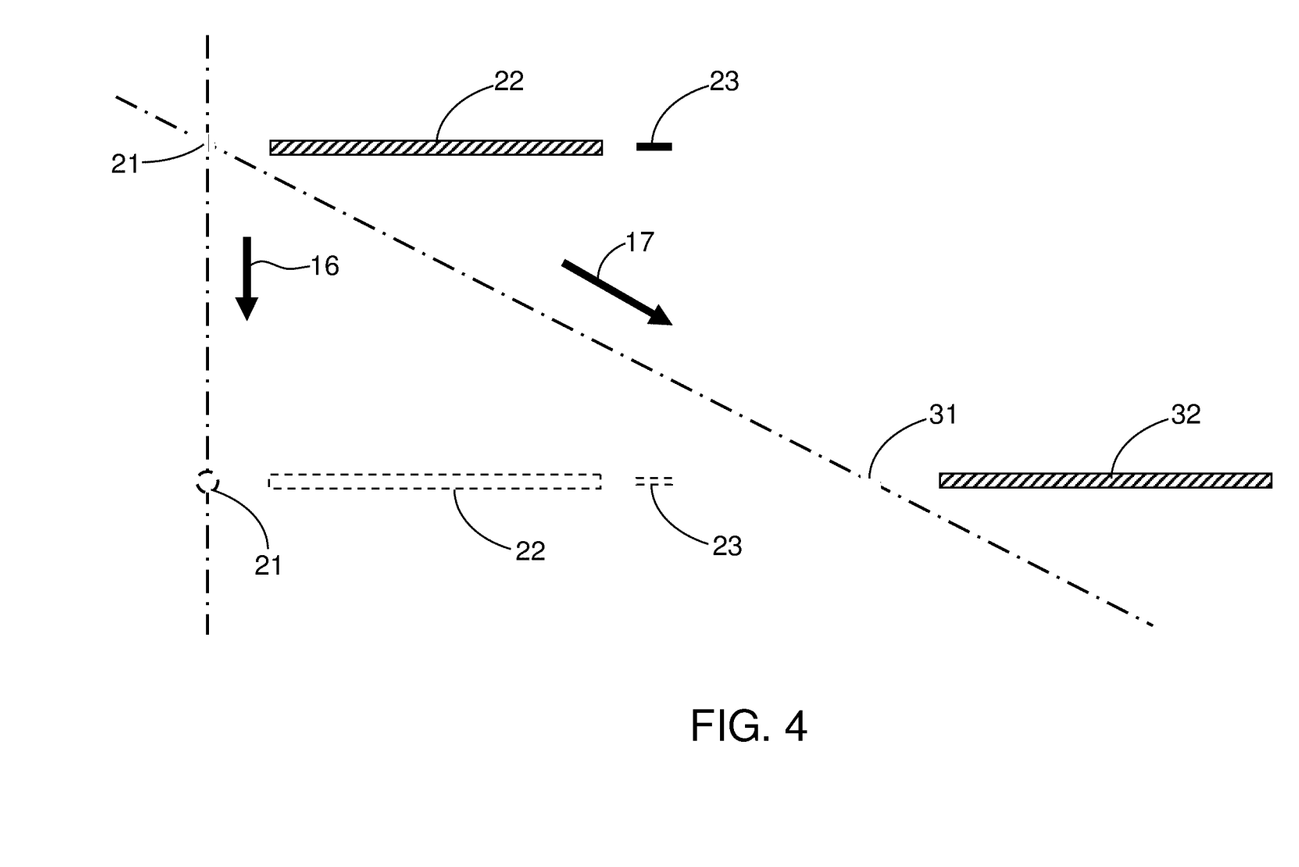
FIG. 4 is a schematic diagram illustrating locations of the cooling fluid, laser light beam, and initiation flaw at the beginning of the scoring process and at a later point in time.

FIG. 4 schematically illustrates these aspects of the '994 publication, where reference numbers 21, 22, and 23 represent the locations at the beginning of the scoring process of (1) the footprint of the cooling fluid, (2) the footprint of the laser light beam, and (3) the initiation flaw, and reference numbers 31 and 32 represent the locations of the footprint of the cooling fluid and the footprint of the laser light beam at a later point in time, after initiation has been completed and the mechanical scoring head is no longer in contact with the ribbon.

As discussed in the '994 publication, to avoid producing a long initiation flaw, the time during which the mechanical scoring head is in contact with the glass ribbon needs to be short. This, in turn, means that the mechanical scoring head has to move towards and then away from the surface of the ribbon at high speed. Although such high speed motion can be achieved, the equipment required is generally complex and expensive. The present disclosure is directed to apparatus and methods for forming an initiation flaw with a mechanical scoring head using reduced speeds for the motions of the head towards and/or away from the surface being scored.

SUMMARY

Figure 5:
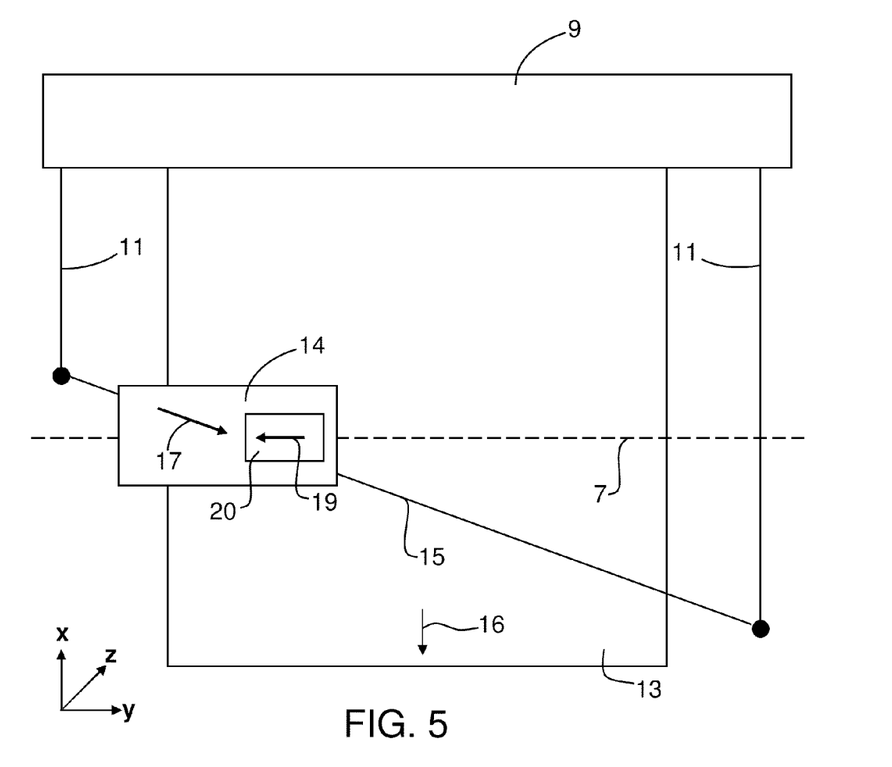
FIG. 5 is a schematic diagram illustrating motions of a glass ribbon, a carriage, and a mechanical scoring head in accordance with an embodiment of the present disclosure.

In accordance with a first aspect, a method is disclosed for scoring a glass surface (114) along a line (7) using a laser light beam (121), the line (7) defining a positive direction (e.g., the direction of the positive y-axis in FIG. 5) and a negative direction (e.g., the direction of the negative y-axis in FIG. 5), the method including:

(a) forming an initiation flaw (111) in the glass surface (114) at a first location (23) along the line (7) using a mechanical scoring head (20) which makes contact with the glass surface (114) for a time period T;

(b) translating a light-emitting device so that its motion includes a component (18) that
  (i) is parallel to the line (7) and
  (ii) as seen from a fixed reference frame (e.g., the xyz coordinate system in FIG. 5) is in the positive direction (e.g., in the direction of the positive y-axis in FIG. 5),
the light-emitting device emitting a laser light beam (121) which traverses a portion of the line (7); and (c) translating a nozzle (119) in tandem with the light-emitting device, the nozzle (119) emitting a cooling fluid which traverses a portion of the line (7);

wherein for at least a portion of the time period T, the motion of the mechanical scoring head (20) includes a component (19) that
  (i) is parallel to the line (7), and
  (ii) as seen from a reference frame that moves with the light-emitting device, is in the negative direction (e.g., in the direction of the negative y-axis in FIG. 5).

In accordance with a second aspect, a method is disclosed for forming an initiation flaw (111) in a glass surface (114) which includes:

(a) moving a carriage (14) relative to the glass surface (114), the motion including a component (18) in a first direction (e.g., in the direction of the positive y-axis in FIG. 5); and (b) during a portion of step (a), moving a mechanical scoring head (20) relative to the carriage (14) in a direction (e.g., in the direction of the negative y-axis in FIG. 5) opposite to the first direction (e.g., the direction of the positive y-axis in FIG. 5);

wherein during at least a portion of step (b), the method further includes moving the mechanical scoring head (20) towards the glass surface (114), away from the glass surface (114), or both towards the glass surface and away from the glass surface (114).

In accordance with a third aspect, apparatus is disclosed for forming an initiation flaw (111) in a glass surface (114) that includes:

(a) a linear track (15) having associated therewith an xyz coordinate system, the linear track (15) lying in the xy plane of the coordinate system and intersecting the x-axis at a non-zero angle;

(b) a carriage (14) moveably mounted on the linear track (15) so that motion of the carriage (14) along the linear track (15) includes at least a component (18) along the y-axis of the xyz coordinate system; and (c) a mechanical scoring head (20) moveably mounted on the carriage (14) so that motion of the mechanical scoring head (20) relative to the carriage (14) includes (i) at least a component (19) along the y-axis of the xyz coordinate system in a direction opposite to the direction of the component (18) of the carriage's motion along that axis, and (ii) at least a component in the direction of the z-axis of the xyz coordinate system.

The reference numbers used in the above summaries of the various aspects of the disclosure are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification. It is to be understood that the various features of the invention disclosed in this specification and in the drawings can be used in any and all combinations.

The reference numbers used in the figures correspond to the following:

7 line along which scoring takes place
9 equipment which produces glass ribbon
11 support frame for linear track
13 glass ribbon
14 carriage
15 linear track
16 vector representing motion of ribbon and vertical component of motion of carriage
17 vector representing motion of carriage
18 vector representing horizontal component of motion of carriage
19 vector representing retrograde motion of mechanical scoring head
20 mechanical scoring head
21 location of footprint of cooling fluid at beginning of scoring process
22 location of footprint of laser light beam at beginning of scoring process
23 location of initiation flaw at beginning of scoring process
31 location of footprint of cooling fluid at a later point in scoring process
32 location of footprint of laser light beam at later point in scoring process
40 platform
42 rail
44 rail
46 motor
48 wheel
50 elongated portion of platform 40
60 arm
62 pivot axis for arm
64 arrow indicating rotation of arm
66 constant force device, e.g., air cylinder
111 initiation flaw
112 glass sheet or glass ribbon
113 laser light beam footprint
114 major surface of glass sheet or glass ribbon
115 score line
119 cooling nozzle
121 laser light beam

DETAILED DESCRIPTION

As indicated above, in a representative embodiment, the present disclosure relates to apparatus and methods for producing an initiation flaw in a moving glass ribbon using a mechanical scoring device. The mechanical scoring device can have a variety of configurations and constructions, now known or subsequently developed. However constructed, the mechanical scoring device will include a mechanical scoring head which contacts the surface of the glass ribbon and forms the initiation flaw. Representative constructions can include an indenter or score wheel made of tungsten carbide or diamond attached to a mechanism, e.g., an air cylinder, for maintaining a substantially constant scoring force on the glass surface irrespective of variations in the location of that surface, e.g., variations in a direction normal to the nominal plane of the glass surface.

Because glass ribbons can be quite thin and flexible, e.g., the glass ribbons used to produce substrates for display applications can have a thickness of 0.7 millimeters or less, an anvil (also known as a nosing) will normally be located on the side of the glass ribbon opposite to the mechanical scoring head so as to provide a stop for the scoring head to work against. The anvil can be mounted on its own linear track which either can be angled like track 15 in FIG. 5 or can be parallel to the direction of motion of the ribbon. Since the initiation flaw only constitutes a small fraction of the width of the ribbon (see below), a short anvil can be used, although an anvil which extends over the entire width of the ribbon may be desirable for some applications, e.g., where mechanical scoring over the full width of the ribbon is to be used as a back-up system for laser scoring.

In general terms, the initiation flaw will have a length in the range from about 3 millimeters to about 5 millimeters, although longer and shorter flaws can be used if desired. Typically, the flaw will be located about 60 millimeters inboard from one edge of the glass ribbon, although again different spacings can be used if desired. The rate of scoring will, of course, depend on the application, a representative value being on the order of 750 millimeters/second. For this scoring rate, a 5 millimeter flaw corresponds to 7 milliseconds of contact between the scoring head and the surface of the ribbon. As noted above in connection with the discussion of the '994 publication, such a short contact period can be achieved but generally requires the use of complex and expensive equipment to rapidly move the mechanical scoring head into and out of contact with the surface of the glass ribbon.

Figure 6:
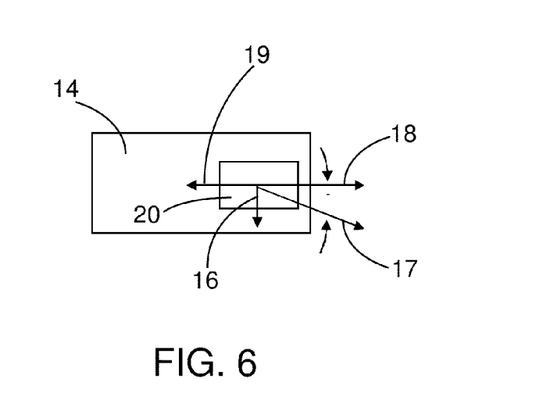
FIG. 6 is a schematic diagram illustrating the motions of the mechanical scoring head of FIG. 5 in more detail.

FIGS. 5 and 6 schematically illustrate a combination of motions of the glass ribbon, the carriage, and the mechanical scoring head which allows for lower speeds for the motions of the scoring head towards and away from the surface being scored. As in FIGS. 2 and 3, reference numbers 16 and 17 in FIGS. 5 and 6 represent the motions of the glass ribbon and the carriage as seen from a fixed reference frame (e.g., the xyz reference frame shown in FIG. 5 which can be considered as associated with frame 11), and reference number 18 represents the motion of the carriage as seen from the moving ribbon.

Reference number 19 in FIGS. 5 and 6 represents an additional motion of the mechanical scoring head 20 as seen from the moving carriage (hereinafter referred to as a "retrograde" or "regulating" motion). This additional motion 19 is in the opposite direction to the motion of the carriage, specifically, it is in the opposite direction of the motion of the carriage as seen from the glass ribbon, i.e., motion 19 (as seen from the moving carriage) points in the opposite direction to motion 18 (as seen from the glass ribbon). As a result, as seen from the glass ribbon, the mechanical scoring head (but not the entire carriage) moves across the ribbon at a slower rate, i.e., it moves at a rate equal to the difference between the magnitudes of motions 18 and 19. Conversely, as seen from the horizontally moving mechanical scoring head, the ribbon moves horizontally past the head more slowly. Such slower movement means that there is more time for the mechanical scoring head to move into and out of contact with the ribbon to create the initiation flaw, as is desired.

It should be noted that retrograde motion 19 need not occur over the entire time period in which the mechanical scoring head is in contact with the surface of the glass ribbon. Rather, the retrograde motion can occur over only part of that time period. Also, the magnitude of the retrograde motion need not be constant over time, but can, for example, increase, level off, and then decrease while the mechanical scoring head is forming the initiation flaw. Furthermore, the retrograde motion can begin before the mechanical scoring head makes contact with the glass surface and/or can continue after the head comes out of contact with the surface. Combinations and variations of these strategies for contacting the glass surface with the scoring head can also be employed, as desired, provided that for at least a portion of the time period T during which the scoring head is forming the initiation flaw, the motion of the head includes a component that is (i) parallel to the score line and (ii) as seen from a reference frame that moves with the carriage, is in a direction opposite to the direction in which the score line is formed by the laser, e.g., in FIG. 5, the component points in the negative direction of line 7.

The effect of retrograde motion 19 can be understood by considering the problem of painting a spot (as opposed to an elongated line) on a stationary billboard from a moving train. If the person doing the painting walks backwards on the train, the relative speed between the painter and the billboard is reduced. Indeed, if the painter walks backward at the same rate as the train is moving forward, the billboard stands still, making painting a spot easy to do. Similarly, making an initiation flaw on a glass ribbon from a moving carriage is easier to do if the mechanical scoring head is moving backwards relative to the across-the-ribbon motion of the carriage at the time the flaw is produced.

The magnitude of the retrograde motion $S_{retrograde}$ will depend on the value of $S_{score}$, the length of the initiation flaw, and the desired time period for making the initiation flaw. As calculated above, for a scoring speed of 750 mm/sec and an initiation flaw length of 5 millimeters, the time available for making an initiation flaw in the absence of retrograde motion is approximately 7 milliseconds. By setting $S_{retrograde}$ at, for example, 500 mm/sec, the available time increases to 20 milliseconds, while for $S_{retrograde}$ equal to 725 mm/sec, the time becomes 200 milliseconds.

Carriage 14 needs to be long enough to accommodate the retrograde motion of the mechanical scoring head and its associated components. For example, for a 5 mm flaw, if $S_{retrograde}$ is equal to 500 mm/sec, the retrograde motion will constitute a distance of 10 millimeters on the carriage, while if $S_{retrograde}$ is 725 mm/sec, the motion will constitute 145 millimeters. In addition to the distance consumed while the initiation flaw is being made, additional length along the carriage will be consumed in acceleration and deceleration of the mechanical scoring head to $S_{retrograde}$. Accordingly, the specific value chosen for $S_{retrograde}$ will be a tradeoff between 1) the required length of the carriage, 2) the cost and complexity of the equipment needed to accelerate and decelerate the mechanical scoring head to $S_{retrograde}$, and 3) the cost and complexity of the equipment needed to move the mechanical scoring head towards and away from the glass ribbon during the available time provided by the use of the retrograde motion.

Figure 7:
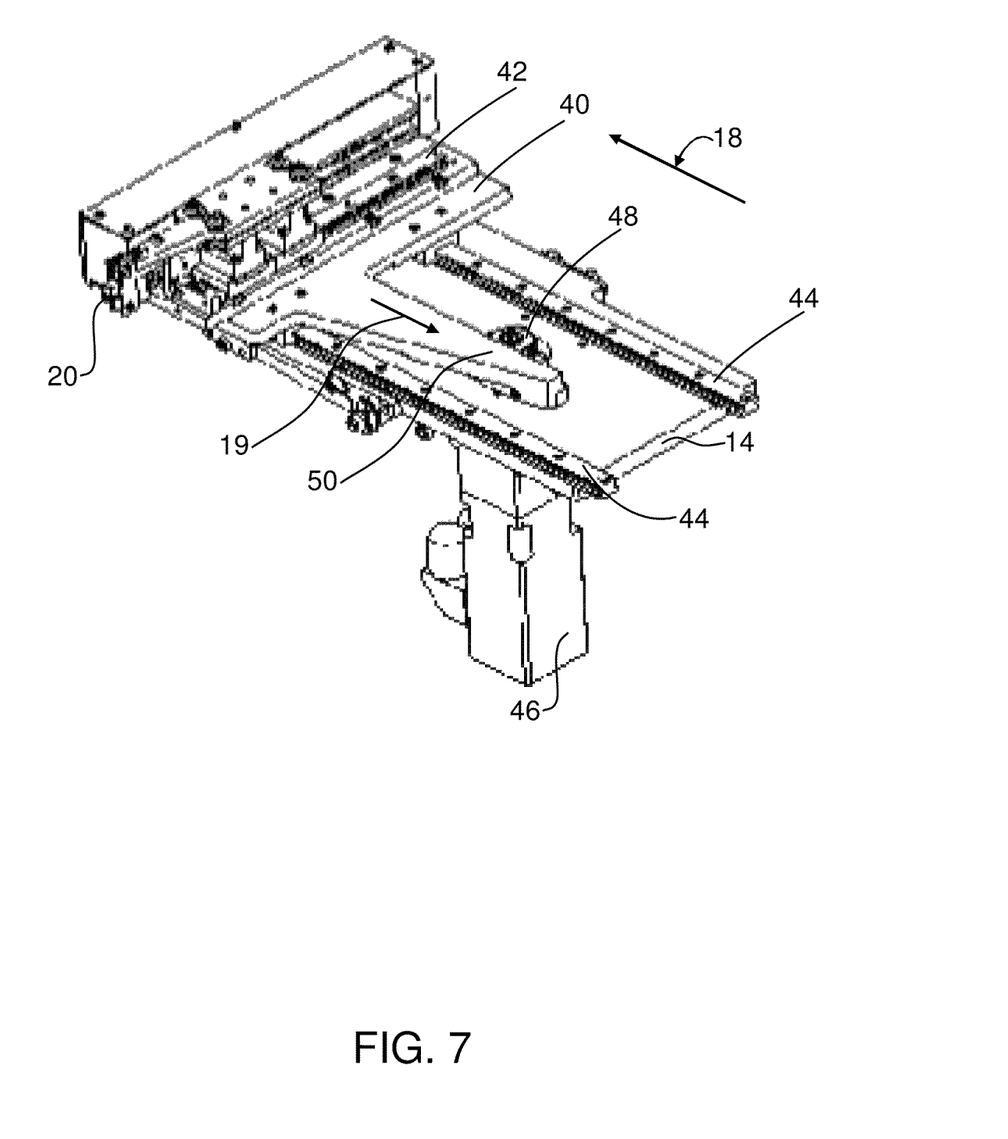
FIG. 7 is a perspective view of representative equipment for producing retrograde motion of a mechanical scoring head.

The retrograde motion of the mechanical scoring head can be achieved in a variety of ways. FIG. 7 illustrates one embodiment in which mechanical scoring head 20 is carried by a platform 40 which includes rail 42 which allows the scoring head to be moved towards and away from the surface of a glass ribbon to form an initiation flaw. Platform 40 is moveably mounted on rails 44 and carriage 14 includes a motor 46, e.g., a servomotor, which drives a wheel 48 which engages a elongated portion 50 of platform 40. Wheel 48 can, for example, have a geared surface which engages a corresponding geared strip on portion 50. Activation of motor 46 causes moveable platform 40 and thus scoring head 20 to execute retrograde/regulating motion relative to carriage 14, i.e., activation of motor 46 causes platform 40 to move to the right in FIG. 7 as carriage 14 is moving to the left (see arrows 18 and 19 in FIG. 7). Although two rails 44 are employed in FIG. 7, a single rail can be used to achieve linear retrograde motion of platform 40, if desired.

Figure 8:
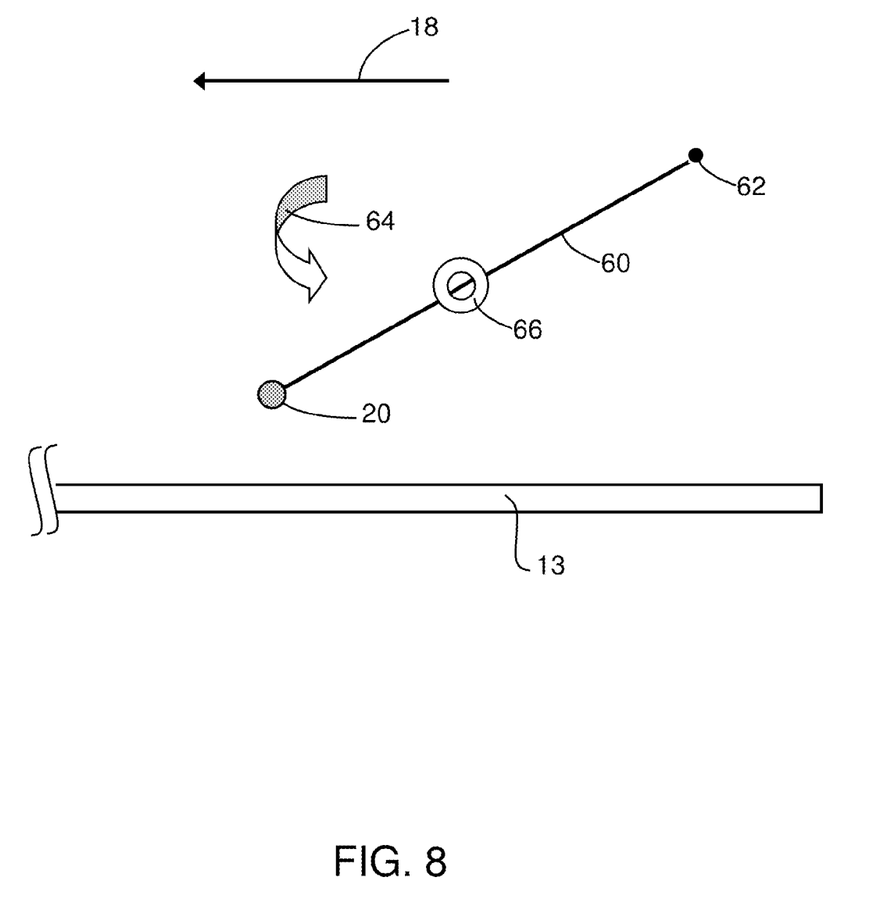
FIG. 8 is a schematic diagram illustrating retrograde motion of a mechanical scoring head achieved through rotation of the scoring head about a pivot affixed to a carriage.

FIG. 8 schematically illustrates another embodiment for achieving retrograde motion of a mechanical scoring head. In this case, scoring head 20 is carried by arm 60 which rotates (pivots) about axis 62 which is fixed relative to the carriage. In FIG. 8, this rotation is illustrated by arrow 64.

Axis 62 is parallel to the direction of motion of glass ribbon 13 so that rotation of arm 60 about axis 62 causes the motion of score head 20, as seen from the moving carriage, to include a component (the desired retrograde component) opposite to the direction of motion of the carriage as seen from the glass ribbon, i.e., in FIG. 8, rotation 64 causes score head 20's motion, as seen from the carriage, to include a component which is opposite to vector 18, which represents the motion of the carriage as seen from the moving ribbon.

As the arm rotates about axis 62, the scoring head's motion also includes a component directed normal to the surface of the glass ribbon. To accommodate this motion and to provide a substantially constant scoring force when the scoring head engages the surface of the ribbon, arm 60 can be equipped with an air cylinder 66 or similar constant force device which allows the effective length of the arm to vary based on contact of the scoring head with the ribbon. The length of the initiation flaw produced by the system of FIG. 8 will depend on (1) the fully-extended length of arm 60 and the distance between axis 62 and the surface of the ribbon, which together define the angles of initial and final contact between the scoring head and the ribbon, and (2) the rate of rotation of the arm about axis 62 and the rate of horizontal motion of the carriage relative to the ribbon, which together determine how far along the surface of the ribbon the score head moves while it is in contact with the surface.

Figure 9:
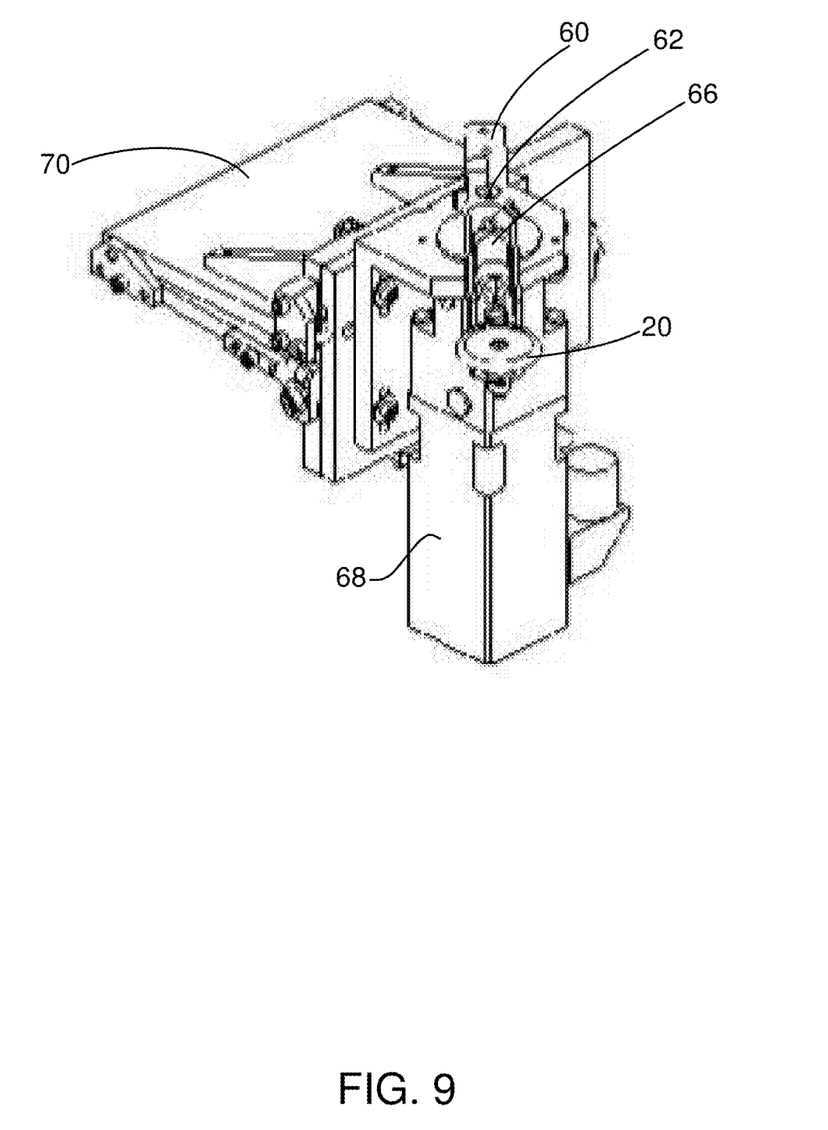
FIG. 9 is a perspective view of representative equipment employing the pivot approach for achieving retrograde motion of FIG. 8.

FIG. 9 shows a representative embodiment of the rotational system of FIG. 8, where the same reference numbers have been used to identify corresponding components. This embodiment includes a motor 68 for rotating arm 60 and a mounting structure 70 for attaching the system to the carriage. In this embodiment, arm 60 extends beyond axis 62 so as to provide a more balanced structure having a lower moment of inertia.

As can be seen from the foregoing, the present disclosure provides apparatus and methods for increasing the time available to move a mechanical scoring head into and/or out of contact with a glass surface to form an initiation flaw. The disclosure thus facilitates laser scoring which, in turn, provides the benefits of clean and strong edges, insensitivity to glass composition and thickness, and minimal disturbance of ribbon motion. In addition, by increasing the track angle α, laser scoring can be performed at a reduced scoring speed which permits deep vent scoring or full body cutting. Furthermore, because the initiation flaw is formed by a mechanical scoring head mounted on the carriage, as opposed to a separate scoring head upstream from the carriage, the system provides mechanical scoring capability for the entire length of the score line which can serve as a backup to laser scoring thus providing a robust cutting process.

A variety of modifications that do not depart from the scope and spirit of the disclosure will be evident to persons of ordinary skill in the art. For example, although the discussion has been primarily concerned with scoring of a moving glass ribbon, the apparatus and methods disclosed herein can also be employed in connection with the scoring of individual glass sheets using a carriage which moves relative to the sheet and which carries a light-emitting device, a nozzle, and a mechanical scoring head. In such a case, if the individual sheet is stationary or, more precisely, stationary in a direction orthogonal to the score line, the angle α, in FIG. 5 will be equal to zero. Similarly, for both the ribbon and individual sheet embodiments, instead of performing scoring in only one direction and then resetting for the next score, the system can be constructed so that scoring can be performed for both directions of travel, e.g., from left to right in FIG. 5, then from right to left, and so on. The following claims are intended to cover modifications, variations, and equivalents to the embodiments set forth herein of these and other types.

What is claimed is:

1. A method of scoring a glass surface along a line using a laser light beam, the line, being an axis of a coordinate system, defining a positive direction and a negative direction, the method comprising:
   (a) forming an initiation flaw in the glass surface at a first location along the line using a mechanical scoring head which makes contact with the glass surface for a contact time period T;
   (b) translating a light-emitting device so that its motion comprises a vectorial component that (i) is parallel to the line and (ii) as seen from a reference frame that does not translate with the light-emitting device is in the positive direction, the light-emitting device emitting a laser light beam which traverses a portion of the line; and
   (c) translating a nozzle in tandem with the light-emitting device, the nozzle emitting a cooling fluid which traverses a portion of the line;
   wherein for at least a portion of the contact time period T, the motion of the mechanical scoring head is retrograde motion which comprises a vectorial component that (i) is parallel to the line and (ii) as seen from a reference frame that translates with the light-emitting device, is in the negative direction.

2. The method of claim 1 wherein for the entire contact time period T, the motion of the mechanical scoring head is retrograde motion which comprises a vectorial component that is (i) parallel to the line and (ii) as seen from the reference frame that translates with the light-emitting device, is in the negative direction.

3. The method of claim 1 wherein the glass surface is a surface of an individual glass sheet.

4. The method of claim 1 wherein:
   (i) the glass surface is a surface of a glass ribbon which moves in a direction perpendicular to the line; and
   (ii) the light-emitting device, the nozzle, and the mechanical scoring head move in the perpendicular-to-the-line direction and keep pace with the glass ribbon.

5. The method of claim 4 wherein the glass ribbon moves vertically.

6. The method of claim 4 wherein the light-emitting device, the nozzle, and the mechanical scoring head are carried by a carriage which moves along a track which is not parallel to the line.

7. The method of claim 1 wherein the mechanical scoring head pivots about an axis which is fixed as seen from a reference frame that translates with the light-emitting device.

8. A method of forming an initiation flaw in a glass surface comprising:
   (a) moving a carriage relative to the glass surface, the motion comprising a vectorial component in a first direction; and
   (b) during a portion of step (a), moving a mechanical scoring head relative to the carriage in a direction opposite to the first direction, said motion constituting retrograde motion as seen from the carriage;
   wherein during at least a portion of step (b), the method further comprises moving the mechanical scoring head into contact with the glass surface, out of contact with the glass surface, or both into contact with the glass surface and out of contact with the glass surface.

9. The method of claim 8 wherein the glass surface is a surface of an individual glass sheet.

10. The method of claim 8 wherein the glass surface is a surface of a moving glass ribbon and during steps (a) and (b), the carriage and the mechanical scoring head keep pace with the motion of the ribbon.

11. The method of claim 8 wherein the carriage moves along a track during step (a).

12. The method of claim 11 wherein the track is not parallel to the first direction.

13. The method of claim 8 wherein step (b) comprises rotating the mechanical scoring head about an axis which moves with the carriage.

\* \* \* \* \*